United States Patent [19]

Bertellotti et al.

[11] 3,716,760

[45] Feb. 13, 1973

[54] PRINTED WIRING CARD SHELF

[75] Inventors: Ansano Bertellotti, Addison; Robert F. Thayer, Glen Ellyn, both of Ill.

[73] Assignee: G F E Automatic Electric Laboratories, Incorporated, Northlake, Ill.

[22] Filed: April 27, 1972

[21] Appl. No.: 248,277

[52] U.S. Cl. ................317/101 DH, 211/41, 317/100

[51] Int. Cl. ................................................H02b 1/02

[58] Field of Search...........317/101 DH, 100; 211/41

[56] References Cited

UNITED STATES PATENTS 2,945,989 7/1960 Vogel et al. ..........................317/100

3,271,626 9/1966 Howrilka .......................317/101 DH

*Primary Examiner*—David Smith, Jr.

*Attorney*—B. E. Franz et al.

[57] ABSTRACT

There is herein disclosed a printed wiring card file including a front support formed of a rectangular tubular member having a slotted steel card guide on its top and bottom surfaces and a rear support formed of a circular tubular member having a slotted card guide at the top and bottom. The front card guide slots are so shaped as to align a wiring card horizontally with the rear card guide slots while the rear support member serves to vertically align the wiring card during insertion.

7 Claims, 2 Drawing Figures

PRINTED WIRING CARD SHELF

BACKGROUND OF THE INVENTION

1. Field of the Invention

The present invention relates most generally to the field of printed wiring card files and more particularly to a self-aligning wiring card file.

2. Description of the Prior Art

Prior to the present invention printed wiring cards have commonly been mounted in and supported by card guides which are part of a generally box-like structure. With the modern requirements for high density electronic packaging a number of problems have been encountered with the prior art type of wiring card files. One such problem arises in that each card file is typically independent of the vertically adjacent card files in an electronic rack which leads to excessively expensive construction since many parts are necessarily duplicated. The box-like card file further impedes convection cooling of the wiring cards since the box structure and wiring card guides interfere with the air flow. Finally, the prior art card guides must be fabricated within relatively close tolerances such that the wiring cards are accurately guided into connector sockets mounted to the wiring backplane at the rear of the file. Unfortunately, these card guides will typically not accept even nominally warped wiring cards which are otherwise electrically acceptable for use.

OBJECTS AND SUMMARY OF THE INVENTION

From the foregoing discussion it will be apparent that among the various objectives of the present invention are included the following:

the provision of a new and improved printed wiring card file;

the provision of apparatus of the above-described character wherein each file shelf serves two vertically adjacent rows of printed wiring cards;

the provision of apparatus of the above-described character which maximizes convection cooling while providing high density card filing; and the provision of apparatus of the above-described character which accommodates and automatically aligns nominally warped wiring cards.

These and other objectives of the present invention are efficiently achieved by providing front and rear tubular support members mounted in end brackets which are in turn affixed to the vertical support members of the wiring card file. The forward tubular support is rectangular in cross-section and is provided with a slotted wiring card guide at its upper and lower surfaces. The rear tubular member is circular and is also provided with a slotted upper and lower card guide. The dimensions of the forward slotted wiring card guide are selected to horizontally align a wiring card with the corresponding rear card guide slot while vertical alignment is provided by the circular cross-section of the rear tubular support member. The requirement for a full length card guide is thus completely eliminated.

The foregoing as well as other objects, features and advantages of the present invention will become more apparent from the following detailed description taken in conjunction with the appended drawings.

DESCRIPTION OF THE PREFERRED EMBODIMENT

Figures 1, 2:
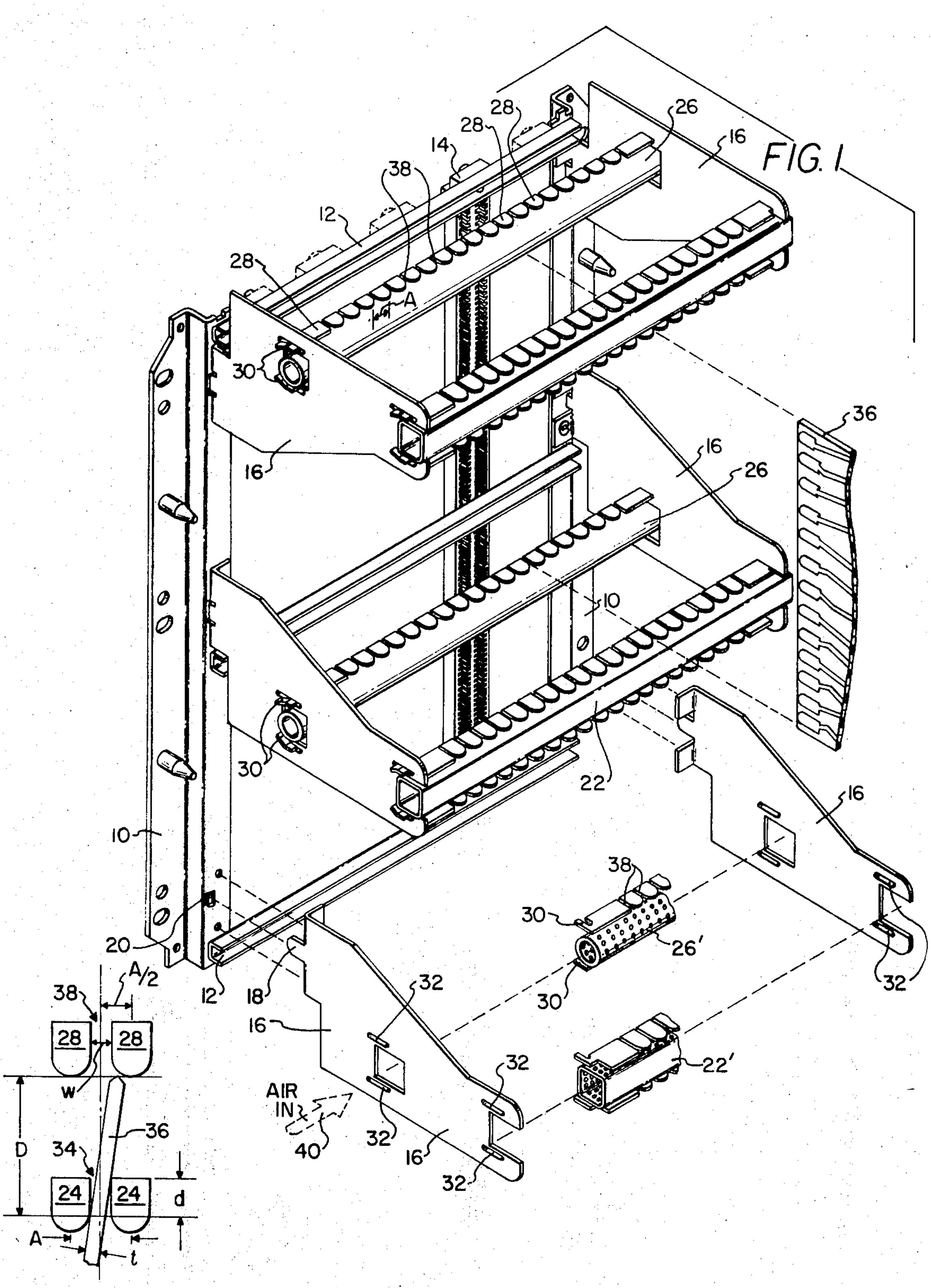
FIG. 1 is a partially exploded perspective view of a printed wiring card file constructed in accordance with the principles of the present invention.
FIG. 2 is a diagram illustrating the physical relationships among the card guide components of the present invention.

Turning now to FIG. 1 there is illustrated a wiring card file including upright support members 10 coupled together by horizontal back plane members 12 to which an array of back plane connectors 14 may be affixed. End brackets 16 are affixed to the upright supports 10 and are provided with locating tabs 18 adapted to engage corresponding apertures 20 in the upright members 10.

The front wiring card supporting member is formed of a rectangular tube 22 which is provided with a slotted wiring card guide 24 at its upper and lower surfaces. The card guide 24 may conveniently be stamped from sheet steel stock and bent to fit about the rectangular tube 22. In this form it is easily attached to the tube 22 from the rear by rivets or screws (not shown). In a similar fashion the circular rear supporting member 26 is provided with a slotted wiring card guide 28. Each of the slotted card guides is provided at its ends with twist tabs 30 which engage corresponding apertures 32 in each of the end brackets 16. These tabs are then twisted to lock the front and rear supporting members in the assembled position.

In order that the requirement for full depth; i.e., front to back, card guides be eliminated it is preferred in the practice of this invention that the wiring card guide slots 34 in the front guide 24 be of dimensions which restrict the maximum horizontal misalignment of a printed wiring card 36, shown only in part, to an amount less than the center to center spacing, A, between the card guide slots 38 in the rear guide 28. In one embodiment of the present invention actually fabricated by the Applicants it was found that front card guide slots 0.080 inch wide by 0.563 inch deep were adequate to direct printed wiring cards of thicknesses ranging between 0.058–0.072 inch to within the ±0.265 inch tolerance between adjacent 0.080 inch wide rear card guide slots 38.

The horizontal surfaces of the rectangular tubes 22 provide some measure of vertical alignment for the printed wiring card 36 as it is inserted into the card file, although there generally will be some vertical misalignment. Through the use of circular tubing 26 in the rear support the wiring card 36 is automatically directed vertically into alignment and then into horizontal alignment with the rear card guide slots 38 by their rounded entry configuration.

It will be understood that each shelf-like structure comprising front and rear supporting guide members and their associated end brackets serves two vertically adjacent arrays of printed wiring cards without the use of any separate full depth wiring card guides. The tubular supporting structure provides high strength without inhibiting the flow of cooling air between the wiring cards.

A better understanding of the Applicants' invention may be had through the simplified diagrammatic representation of FIG. 2 wherein elements common to those shown in FIG. 1 are identified by like reference characters. As stated hereinabove the forward card guide slots 34 in the front guide 24 are dimensioned such that the maximum horizontal misalignment of printed wiring card 36 is less than the limits of the entrance to the rear card guide slots 38. In order to satisfy this condition the product of the amount by which the guide slot width, *w*, exceeds the thickness, *t*, of the wiring card 36 times the distance, *D*, between the front of the forward card guide slot 34 and the forward edge of the rear card guide slot 38 entrance, divided by the depth, *d*, of the forward card guide slot 34 will be no greater than one half the center-to-center spacing, A, between the rear card guide slots 38. Expressed more simply:

$$D(w-t)/d \leq A/2$$

In many electronic systems it is desirable to provide forced air cooling for the rack mounted components. It will be noted that the structure of the present invention readily accommodates a forced air cooling arrangement. Cooling air schematically illustrated in phantom by the arrow 40 may easily be pumped through the front and rear tubular support members 22 and 26 respectively. Cooling may then be effected either by conduction from the wiring cards to the tube walls or the tubular support members may be perforated as shown at 22' and 26' such as to discharge forced air into the card file to thereby enhance component cooling.

With the foregoing construction it has been found by the Applicants that considerable savings in both materials and assembly costs are provided through the practice of their invention. The efficiency of requiring only one wiring card file shelf to serve two vertically adjacent card arrays and the fact that the file shelves may easily be separately assembled prior to mounting on the vertical support members contribute to the ease of assembly and together with the elimination of full depth wiring card guides provide both economy of construction and maximum flow of convection air currents through the card file.

From the foregoing it will be seen that the Applicants have provided a new and improved printed wiring card file whereby the objectives set forth hereinabove are efficiently attained. Since certain changes in the above-described construction will occur to those skilled in the art without departure from the scope of the invention it is intended that all matter set forth in the above description or shown in the appended drawing shall be interpreted as illustrative and not in a limiting sense.

Having described what is new and novel and desired to secure by Letters Patent, what is claimed is:

1. A printed wiring card file including a plurality of vertically adjacent card file shelves, adapted for mounting to a wiring backplane, each said shelf comprising a forward supporting member of substantially rectangular cross-section, and a first wiring card guide member including a plurality of parallel card guide slots affixed to the upper and lower surfaces of said forward supporting member, a rearward supporting member of substantially circular cross-section, and a second wiring card guide member including a plurality of parallel card guide slots affixed to said rearward supporting member, means for suspending said forward and rearward supporting members in a substantially parallel spaced apart relationship with the card guide slots of said first and second wiring card guide members in substantial alignment, and said card guide slots in said first wiring card guide member having dimensions such that the maximum horizontal misalignment of a printed wiring card inserted therein is less than one half the spacing between two adjacent parallel and guide slots in said second wiring card guide member.

2. Apparatus as recited in claim 1 wherein said forward and rearward supporting members are hollow tubular members.

3. Apparatus as recited in claim 2 wherein the walls of said hollow tubular members are perforated, and further including means for forcing air into the ends of said tubular members such that air is forced through said perforations into said wiring card file.

4. Apparatus as recited in claim 1 wherein each of said first and second wiring card guide members comprise an elongate sheet metal member having a plurality of opposed parallel transverse slots disposed in the longitudinal edges thereof and formed about said forward and rearward supporting members to provide said upper and lower card guide slots.

5. Apparatus as recited in claim 1 wherein the forward ends of each of said card guide slots include an entry portion which curves horizontally outwardly to define a preselected wiring card acceptance dimension.

6. Apparatus as recited in claim 5 wherein said maximum horizontal misalignment of said printed wiring card is no greater than one half said wiring card acceptance dimension of said card guide slots in said second wiring card guide member.

7. Apparatus as recited in claim 6 wherein the dimensions of said card guide slots in said first wiring card guide member are selected to substantially satisfy the relationship $$D(w-t)/d \leq A/2$$

wherein $D$ is the distance by which said forward and rearward supporting members are spaced apart, $w$ is the width of each of said parallel card guide slots, $t$ is the thickness of said printed wiring card, $d$ is the depth of said card guide slots in said first wiring card guide member, and $A$ is the acceptance dimension of said card guide slots in said second wiring card guide member.

* * * * *

UNITED STATES PATENT OFFICE
CERTIFICATE OF CORRECTION

Patent No. 3,716,760 Dated February 13, 1973

Inventor(s) BERTELLOTTI, Ansando and THAYER, Robert F.

It is certified that error appears in the above-identified patent and that said Letters Patent are hereby corrected as shown below:

Title page, [73], should be GTE Automatic Electric Laboratories Incorporated omit "," between Laboratories and Incorporated

Signed and sealed this 20th day of November 1973.

(SEAL)
Attest:

EDWARD M.FLETCHER,JR.
Attesting Officer

RENE D. TEGTMEYER
Acting Commissioner of Patents